United States Patent
Richter

(10) Patent No.: US 6,727,928 B1
(45) Date of Patent: Apr. 27, 2004

(54) METHOD OF DISPLAYING PRODUCT SELECTION ON WEB SITE

(75) Inventor: James R. Richter, Lincolnshire, IL (US)

(73) Assignee: Metraflex Company, Chicago, IL (US)

( * ) Notice: Subject to any disclaimer, the term of this patent is extended or adjusted under 35 U.S.C. 154(b) by 0 days.

(21) Appl. No.: 09/493,053

(22) Filed: Jan. 28, 2000

(51) Int. Cl.[7] ................................. G06F 17/30
(52) U.S. Cl. ......................... 345/854; 345/244
(58) Field of Search ............... 345/762, 765, 345/744, 854

(56) References Cited

U.S. PATENT DOCUMENTS

| | | | | |
|---|---|---|---|---|
| 5,293,479 A | * | 3/1994 | Quintero et al. | 345/841 |
| 5,784,066 A | * | 7/1998 | Aizikowitz et al. | 345/440 |
| 5,808,624 A | * | 9/1998 | Ikedo | 345/435 |
| 6,349,300 B1 | * | 2/2002 | Graf et al. | 707/100 |

* cited by examiner

Primary Examiner—Cao (Kevin) Nguyen
(74) Attorney, Agent, or Firm—Sonnenschein Nath & Rosenthal LLP

(57) ABSTRACT

A method of displaying a product which has features with differently configured permutations is provided, which is especially useful when using a computer program to display the product, such as on a web site of a global computer network. The method provides for different permutations to be selected of the various features and a composite image is generated and displayed of the selected permutations. In this manner, images of the individual permutations must be stored rather than images of all of the different possible combinations of permutations. Such a method considerably reduces the storage requirements for displaying all of the various combinations.

20 Claims, 1 Drawing Sheet

METHOD OF DISPLAYING PRODUCT SELECTION ON WEB SITE

BACKGROUND OF THE INVENTION

The present invention relates to product displays and advertising, and more particularly to a method of displaying products in an interactive setting such as at web site on a worldwide computer network.

Changeable product displays are known, for example, where a consumer can change, for example, the color of a product to see what the product would look like in different colors.

A method for accomplishing this change requires either that the product be photographed in each of the different colors, or that a coloring program be employed to apply color to a photograph of the product.

A difficulty arises, however, when a product configuration changes when a user wishes to select different features, and there is a desire to depict the different features. This would require photographs to be taken of all of the different possible combinations and permutations of products and features, which could quickly overwhelm a capacity for displaying the different combinations. For example, where a product has two different elements which can be changed, and each element has ten possible appearances, there will be one hundred different possible combinations that a user might wish to view.

Where such products are to be displayed on a computer based system, the memory requirements for graphics can quickly become overwhelmed in such a situation, for example in the example just described, one hundred separate graphic images would be required to be stored to accommodate all of the variations.

SUMMARY OF THE INVENTION

The present invention provides a method for displaying permutations where all of the different permiutations are not required to be shown in combinations. Instead, the present invention provides a method of being able to display all of the different combinations by piecing together displays of the individual permutations to provide a composite picture of a desired product.

Therefore, if a product has two changeable features, with each feature having ten possible appearances, only twenty photographs would be required, the ten of each feature, and a composite would be made of the permutation of each feature selected by the user, dramatically reducing the number of individual images required and, in a computer based system, dramatically reducing the memory requirements necessary for storing images of the products.

The provided method, thus, would allow the viewer to select a first feature, and a particular permutation of the first feature, to select a second feature and a particular permutation of the second feature, and so on through all of the possible features.

A composite image would then be generated and displayed from each of the individual feature permutations.

DETAILED DESCRIPTION OF THE PREFERRED EMBODIMENTS

Figure 1:
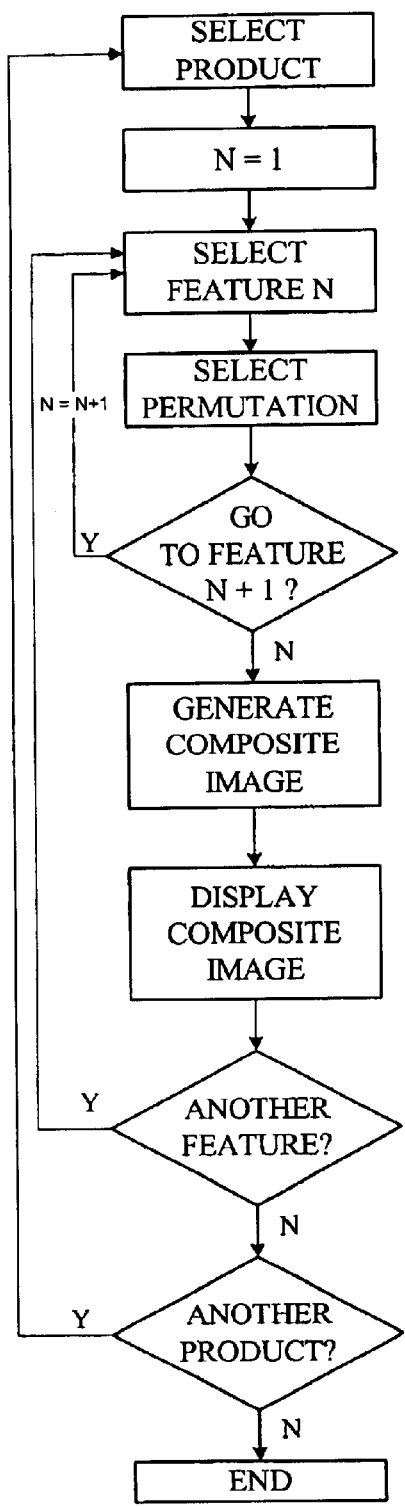
FIG. 1 is a flow chart of the steps involved in a method embodying the principles of the present invention.

Referring to FIG. 1, in step 20, a particular product to be displayed is selected. A given display may be for only a single product, or there may be a plurality of products to choose from. The manner of selecting could include allowing the user to type the name of a product in a designated input box, to type the model number of a product, to access a drop down menu of possible selections or even to view generic images of possible products. All of these different methods of selecting a product are included within the scope of this invention.

In step 22, a counter for the features is initialized.

In step 24, a particular feature is selected. Again, the manner in which the individual feature is selected can be accomplished in several different ways, including all of the ways set forth above with respect to selecting a product.

Once a particular feature has been selected, then, in step 26, a permutation of that feature is selected. Once again, all of the different manners by which the feature or products were selected could be utilized to select the particular permutation of the feature in step 26.

In step 28 there is an inquiry as to whether additional features are to be selected. Here, the program could inquire of the user whether another feature is desired to be selected, or the program could automatically move to the next possible feature.

If an additional feature is to be selected, then in step 30, the counter will be incremented and control returned back to step 24 where the next feature is selected.

If no further features are to be selected, then control passes to step 32 wherein a composite image is generated. This composite image is generated from individual feature images which have been separately stored.

In step 34 the composite image is displayed to the user so that that user can view the selected product with all of the selected permutations of each of the selected features.

In step 36 in inquiry is made as to whether another feature should be selected and, if the response to this inquiry is yes, then control is returned back to step 24 to repeat the above process. If the answer to the inquiry is no, then control passes to step 38 where, potentially, there is a further inquiry as to whether another product is to be selected. If the answer to this inquiry is yes, then control passes back to step 20 to repeat the above process. If the answer to this inquiry is no, then this portion of the program terminates.

Figure 2:
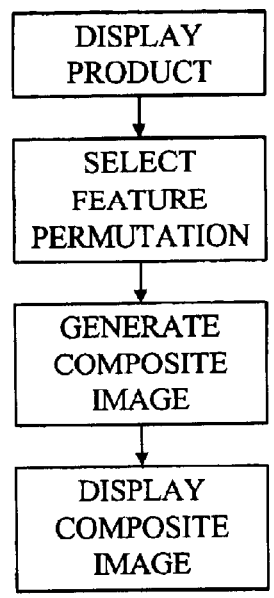
FIG. 2 is a simplified flow chart of a method embodying the principles of the present invention.

FIG. 2 illustrates a flow chart of the present invention in a more simplified fashion, yet which embodies the principles of the present invention.

In step 40 a product is displayed. This may be a display of the product without various possible features or may include a number of or all of the possible variable features, but with a pre-selected permutation of such features. This will permit the user to recognize the general shape and appearance of the product which will be useful to assure the user that the correct product is being reviewed. This product may be selected automatically by the computer program or specifically by the user.

In step 42 a particular feature permutation is selected. This step of selecting can be accomplished in any of the several different ways set forth above with respect to FIG. 1 for selecting a product. Once a particular feature permutation has been selected, control passes to step 44 where a composite image of the product is generated and in step 46 the composite image is displayed.

Steps 44 and 46 may be performed immediately following the selection of each individual feature permutation, or, as described above with respect to FIG. 1, those steps may occur after all desired permutations have been selected.

In the preferred embodiment of the method, the composite image is displayed on a user's computer screen which may be local to the computer in which the program is running, or remote. A particular advantageous use of the method is for advertising or product display on a web site on the global computer network in which the user's computer is remote from the computer (host computer) containing the images in memory of all of the various permutations of the product and the program for carrying out the steps of the method. Inputs by the user are transmitted over the global computer network to the host computer and the display is transmitted back to the user's computer for display to the user.

A particular use of the method which Applicant finds beneficial in its business is the display of metal hose products in which there are three different features of the product comprising a left end, a right end and the middle, with each of the features having various permutations. For example, the middle, which comprises the metal hose, could include a double braided hose, a single braided hose or an un-braided hose. The left end and right end are fittings for the hose by which the hose is to be attached to other components and could be a wide variety of selections, as many as thirty to forty or more. The two ends may be the same or may be different from each other depending upon how each end of the hose needs to be attached. Because the fittings have significantly different appearances between the various permutations, a visual display of what the entire composite product looks like greatly assists the user in selecting the correct permutations, particularly if an order is to be placed based upon the selection made.

Assuming there are 40 left ends, 40 right ends and 3 middles, there would be 4800 possible combinations of permutations. With the method of the present invention, however, only 83 different images are required to be stored, significantly reducing memory requirements.

As a further, optional, method of the invention, other permutations of the various features can be selected which may not have any different appearance, such as diameter, length, material to be used for the fittings or hose, etc., yet which might affect the overall performance of the product and thus its specifications for use in a particular environment.

Hence, other permutations can be selected by the user which are not used to vary the composite display of the product, but which permutations are necessary to be selected in order for a customer to order an appropriate product for shipment.

Figure 3:
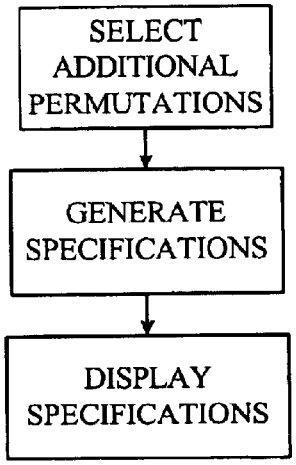
FIG. 3 is a flow chart of further, optional steps of a method embodying the principles of the present invention.

Once all of the permutations (both those that affect appearances as well as those that don't) have been selected as in step 50 of FIG. 3, the computer program could then generate (step 52) a detailed list of specifications for the product based upon all of the various permutations selected, and display (step 54) those specifications to the user so that the user will be able to confirm that the permutations selected are correct and that the product will function properly in the environment in which it is to be placed, or that it will provide all of the features desired by the user.

The specifications to be displayed to the user can be derived from various look up tables or could be generated on the fly based upon predetermined formulas.

In the case of braided hose, specifications could include angular movement that the hose is capable of, a bend radius, an offset range, a pressure rating, a price and similar types of specifications.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A method for displaying a commercial product having various possible fittings by using a computer program via a global computer network comprising the steps:

in step 1, accessing a web site from a computer remote from a host computer and selecting a commercial product from a plurality of products;

in step 2, selecting a fitting of said selected product;

in step 3, selecting a permutation of said fitting;

returning to step 2 if a further fitting is to be selected or proceeding to a step 4 if no further fittings are to be selected;

in step 4, generating a composite image of said selected product with said selected permutations of said selected fittings from stored images of individual permutations of said fittings; and in step 5, displaying said composite image at said remote computer.

2. A method for displaying a plumbing product by using a computer program via a global computer network comprising the steps:

in step 1, accessing a web site from a computer remote from a host computer and displaying at said remote computer a plumbing product with variable visual features including a middle portion and end portions and various specifications related to the variable features;

in step 2, selecting a permutation of at least one of said variable features other than color;

in step 3, generating a composite image of said selected product with said selected permutation of said variable features from stored images of individual permutations of said features;

in step 4, displaying said composite image at said remote computer; and in step 5, displaying at said remote computer the specifications of said selected product based upon said selected permutations.

3. A method according to claim 2, wherein in step 1, a product is selected by a user via an appropriate input to said computer program.

4. A method according to claim 3, wherein said user selects said product by typing a name of said product.

5. A method according to claim 3, wherein said user selects said product by typing a model number of said product.

6. A method according to claim 3, wherein said user selects said product by selecting a product from a drop down menu.

7. A method according to claim 3, wherein said user selects said product by selecting a product from a displayed image of said product.

8. A method according to claim 2, wherein said feature is selected automatically by said computer program.

9. A method according to claim 2, wherein said composite image is generated by combining individual images of said selected permutations of said selected features of said selected product.

10. A method according to claim 2, wherein said composite image is displayed on a computer screen.

11. A method according to claim 2, wherein said return to step 2 is accomplished automatically by said computer program until all possible features have been selected.

12. A method according to claim 2, wherein said return to step 2 is accomplished by a user via an appropriate input to said computer program.

13. A method according to claim 2, wherein said visual feature is a shape of at least a portion of said product.

14. A method according to claim 2, wherein said visual feature is a material of at least a portion of said product.

15. A method according to claim 2, wherein said visual feature is a dimension of at least a portion of said product.

16. A method for displaying a commercial plumbing product by using a computer program comprising the steps:
   in step 1, displaying a plumbing product with variable features, including variable physical components comprising a middle portion and end portions of said product;
   in step 2, selecting a permutation of said variable physical components other than color;
   returning to step 2 if a further permutation of any one of said variable features is to be selected or proceeding to a step 3 if no further permutations are to be selected;
   in step 3, generating a composite image of said displayed product with said selected permutations of said variable features from stored images of individual permutations of said components; and
   in step 4, displaying said composite image.

17. A method according to claim 16, including a step of selecting a product prior to step 1.

18. A method according to claim 16, including a step of selecting one of said variable features prior to step 2.

19. A method for displaying a plumbing product on a user's computer remote from a host computer containing images in memory of various visual permutations of features including a middle portion and end portions of said plumbing product comprising the steps:
   in step 1, from said user's computer, selecting a plumbing product with variable features including a middle portion and end portions and various specifications related to the variable features;
   in step 2, from said user's computer, selecting a first feature of said selected product other than color;
   in step 3, from said user's computer, selecting a permutation of said selected first feature from a group consisting of shape, material and dimension of said first feature;
   returning to step 2 to select a second feature of said selected product different than said first feature and then to step 3 to select a permutation of said selected second feature,
   returning to step 2 if a still further feature is to be selected or proceeding to a step 4 if no further features are to be selected;
   in step 4, at said host computer, generating a composite image of said selected product with said selected permutations of said selected features from stored images of individual permutations of said features; and
   in step 5, at said user's computer, displaying said composite image and the specifications of said selected product based upon said selected permutations.

20. A method for displaying a metal hose product having at least one fitting by using a computer program via a global computer network comprising the steps:
   in step 1, accessing a web site from a computer remote from a host computer and selecting a metal hose product;
   in step 2, selecting a fitting of said selected product;
   in step 3, selecting a permutation of said selected fitting;
   returning to step 2 if a further fitting or other feature is to be selected or proceeding to a step 4 if no further fittings or other features are to be selected;
   in step 4, generating a composite image of said selected product with said selected permutations of said selected fittings and other features from stored images of individual permutations of said fittings; and
   in step 5, displaying said composite image at said remote computer.

* * * * *